United States Patent
McCracken

[19]

[11] Patent Number: 6,152,548
[45] Date of Patent: Nov. 28, 2000

[54] STORAGE CONTAINER FOR COMPACT DISKS

[76] Inventor: Brian McCracken, 21416 Velicata St., Woodland Hills, Calif. 91364

[21] Appl. No.: 09/148,385

[22] Filed: Sep. 4, 1998

[51] Int. Cl.[7] .................................................. A47B 81/06
[52] U.S. Cl. ................. 312/9.48; 312/223.2; 206/307.1; 211/41.12
[58] Field of Search ................................... 312/9.64, 9.63, 312/9.61, 9.56, 9.51, 9.48, 9.47, 9.28, 9.27, 330.1, 333; 206/308.1, 308.3, 307.1, 308.2, 309; 211/41.12, 41.1

[56] References Cited

U.S. PATENT DOCUMENTS

| | | | |
|---|---|---|---|
| 2,615,772 | 10/1952 | Bradley | 312/9.27 |
| 2,740,682 | 4/1956 | Keiper | 312/9.56 |
| 4,236,768 | 12/1980 | Morrone | 312/9.51 |
| 4,641,897 | 2/1987 | Long et al. | 206/308.3 |
| 5,392,913 | 2/1995 | Merrick | 206/308.1 |
| 5,549,375 | 8/1996 | Pagliaccio | 312/223.2 |
| 5,833,331 | 11/1998 | Chang | 312/9.21 |
| 5,887,712 | 3/1999 | Jenkins et al. | 206/307.1 |

Primary Examiner—Peter M. Cuomo
Assistant Examiner—Jerry A. Anderson
Attorney, Agent, or Firm—James E. Brunton

[57] ABSTRACT

A storage container for storing compact disks which includes a number of compact disk receiving trays that are slidably mounted within the hollow housing of the storage container. Each tray is provided with an outwardly extending finger engaging means which can be used to identify each compact disk and to enable easy retrieval of the compact disk from the storage container by sliding the tray forwardly of the container. The storage container can be used on a desk top or alternatively can be removably emplaced within an unused disk drive bag of a personal computer.

7 Claims, 6 Drawing Sheets

6,152,548

STORAGE CONTAINER FOR COMPACT DISKS

BACKGROUND OF THE INVENTION

1. Field of the Invention

The present invention relates generally to storage containers. More particularly, the invention concerns a novel storage container for storing compact disks which is receivable within the front opening of an unused disk drive bay of a personal computer.

2. Background of the Invention

In modern personal computers there typically exists within the computer housing a plurality of front open bays or compartments within which various types of disk drives can be mounted. The disk drive bays are generally of standard size and are adapted to closely receive computer disk drives of conventional size and construction.

In many cases, personal computers are sold with only a single disk drive thereby leaving one or more disk drive bays unused. As a general rule those unused bays are closed by a removable disk drive receiving cover plate. Once the cover plate is removed access can be had to the disk drive receiving chamber of the computer housing.

It is a primary object of the present invention to provide a novel compact disk storage container which is specially sized and configured to be closely received within an unused disk drive bay of a personal computer. In one form of the invention, the storage container includes a plurality of specially configured, compact disk storage trays which are slidably mounted within the container housing for forward movement between a closed storage position within the housing and a retracted position wherein the compact disk can be conveniently removed from the storage tray.

In the past, a number of prior art devices have been suggested for the storage of various articles within the receptacles that are receivable within the unused disk drive bays of a personal computer. One such prior art device is disclosed in U.S. Pat. No. 4,712,843 issued to Castelle et al. This latter patent discloses a method and apparatus for providing a storage receptacle within unused disk drive bays of personal computers. The Castelle et. al. storage receptacle comprises a box like structure having at least one side wall with threaded openings therein for receiving screws adapted to hold the receptacle in position within the chamber or bay normally occupied by a disk drive.

Another storage apparatus for use in connection with personal computers is disclosed in U.S. Pat. No. 5,080,452 issued to Tuckman. The Tuckman patent concerns a box shaped receptacle having a front opening. The box shaped receptacle is designed to be inserted through an opening formed in the front panel of a personal computer and into an unused disk drive bay. The storage receptacle is designed for storing items such as pencils, paper clips, floppy disks and alike. A down turned flange is provided across the bottom of the receptacle and functions to limit the extent to which the receptacle can be inserted into the disk drive bay.

Unlike the prior art devices described in the preceding paragraphs, the storage container of the present invention is uniquely designed to safely store and retrieve a plurality of compact discs. For this purpose a number of compact disc receiving trays are slidably mounted within each storage container and each tray is provided with an outwardly extending finger engaging means which can be used to identify each compact disk and to enable easy retrieval of the compact disk from the storage container by sliding the tray forwardly of the container.

DESCRIPTION OF THE INVENTION

Figure 1:
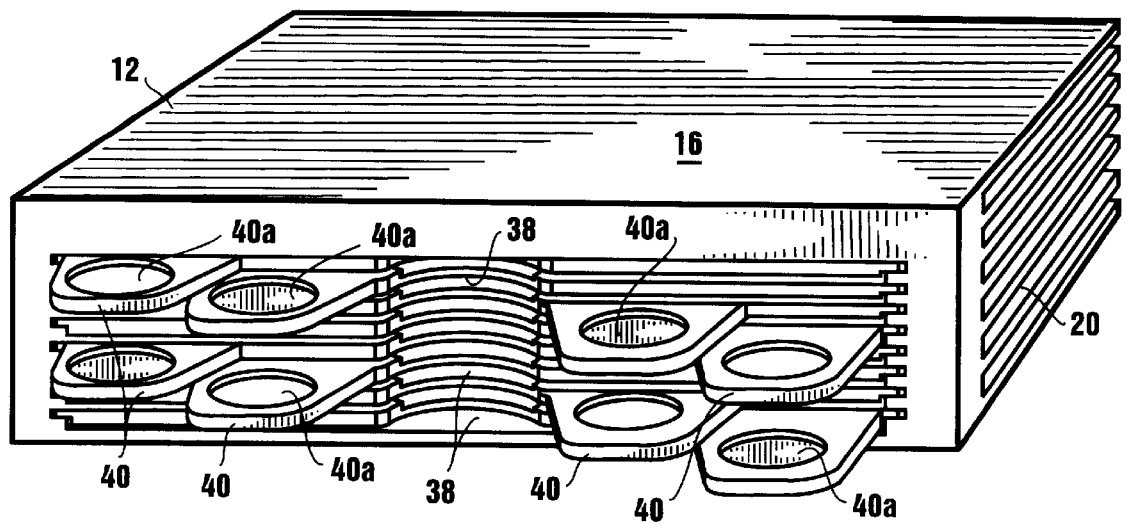
FIG. 1 is a generally perspective view of one form of the storage container of the present invention.
Figure 4:
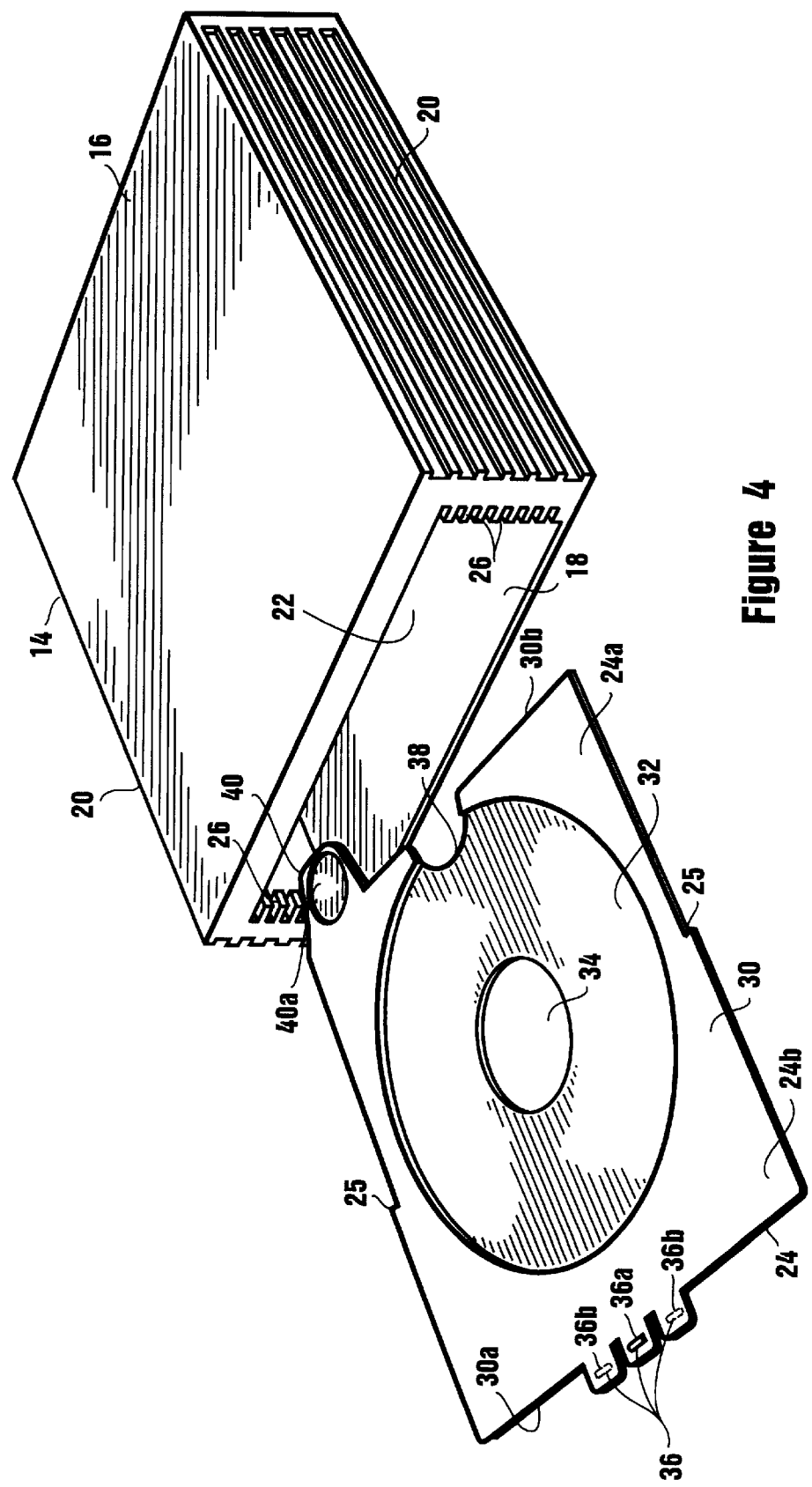
FIG. 4 is a generally perspective rear view of the container housing and of one of the plurality of compact disk supporting trays which is slidably receivable into the rear opening of the container housing.

Referring to the drawings and particularly to FIGS. 1 and 4, one form of the storage container of the present invention for storing compact disks is there illustrated and generally designated by the numeral 12. The storage container includes a housing 14 having interconnected bottom, rear and opposing side walls 16, 18, and 20 respectively. These interconnected walls cooperate to define an interior space 22 which is adapted to receive a plurality of compact disk supporting trays 24 which are of the general configuration shown in FIG. 4. Each of the plurality of storage trays 24 is slidably receivable within grooves 26 formed in the opposing side walls 20 of the storage container housing.

Referring to FIG. 4 it can be seen that each of the compact disk support trays 24 includes a generally rectangular shaped body portion 30 within which a generally circular shaped depression 32 is formed. Depression 32 has a diameter only slightly larger than the diameter of the conventional compact disk so that the disk will be closely received within the recessed portion 32. Formed centrally of recessed portion 32 is a generally circular shaped opening or aperture 34.

Body portion 30 includes a rear edge, 30a which includes three spaced apart, tabs 36 which extend rearwardly from edge 30a. Body portion 30 also has a front edge 30b which is provided with a generally semi-circular shaped opening 38 for receiving the fingers of the user of the storage container to enable easy removal of the compact disk that is disposed within recess 32. Also formed on front edge 30b of each of the compact disk storage trays is a outwardly extending finger engaging tab 40 for gripping by the user of the device to pull the storage tray forwardly of the housing to gain access to the compact disk disposed within recess 32. Each of the tabs 40 include a central recessed portion 40a for receiving identifying indicia for identifying the compact disk stored within the particular tray. (FIG. 3) It is to be noted that each tray 24 has a forward portion 24a having a first width and a rearward position 24b having a second greater width. At the juncture of portions 24a and 24b a stop surface 25 is formed. Stop surfaces 25 which are located on either side of the tray, comprise the stop means of the invention, and, in a manner presently to be described prevent forward removal of the trays from the interior space 22.

Figure 5:
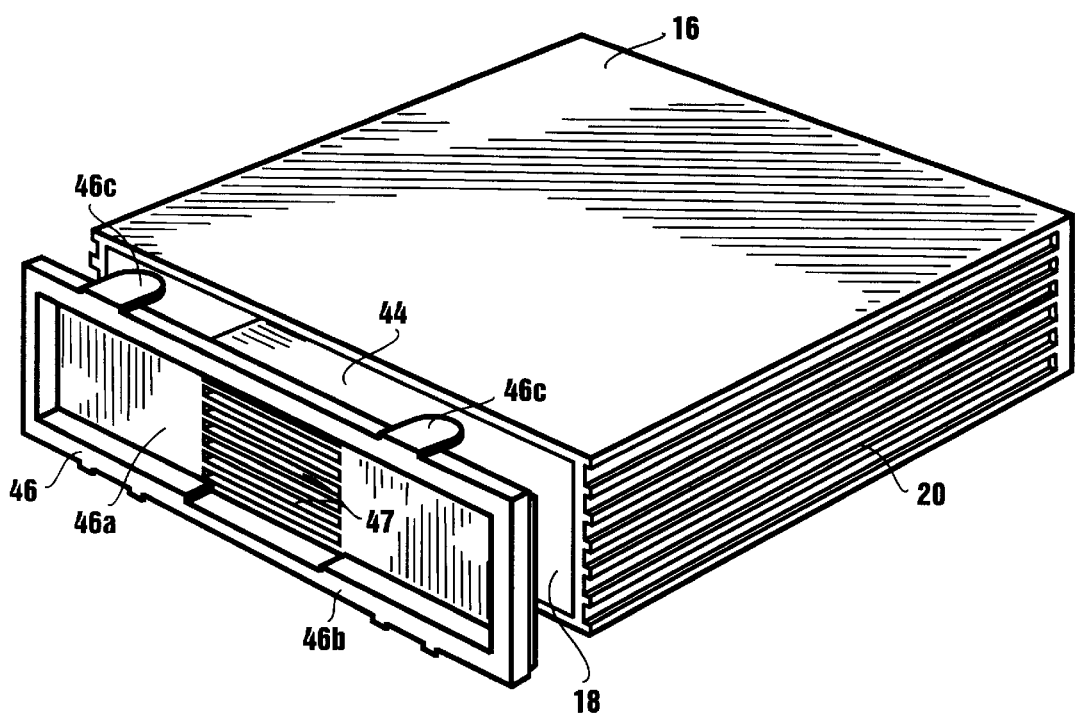
FIG. 5 is a generally perspective rear view of the housing of the storage container illustrating the construction of the rear closure panel and its method of interconnection with the hollow housing of the storage container.
Figure 4A:
FIG. 4A is a side elevational view of one of the compact disk supporting trays.

Turning next to FIG. 5, it is to be observed that the rear opening of the container housing is closed by a removably connected, specially configured end panel 46. End panel 46 includes a central body portion 46a and a peripheral frame like portion 46b. Strategically formed in body portion 46a is a plurality of vertically spaced apart slots 47. Slots 47 are arranged to closely receive the tabs 36 which are formed on each rear edge of each of the compact disks support trays 24. More particularly when the support tray 24 are fully inserted within the storage container body and the rear panel is interconnected with the container housing tabs 36 extend rearwardly through slots 47. With this construction, each of the compact disks storage trays 24 is securely structurally supported within the open interior chamber of the container body. In this regard it can be seen by referring to FIG. 5 that each of each of the rearwardly extending tabs 36 of each of the storage trays 24 is provided with top and bottom protuberances 36a and 36b which comprise the securement means of the invention and function to engage slots 47 in a manner to prevent accidental forward sliding of the trays 24 within the housing. It is also to be noted from FIG. 4A that edges 25 include wall sections 24c that are thinner than the body portion of the tray. These reduced thickness wall sections 24C are closely receivable within groves 26 formed in the side walls 20 of the container so that the storage trays will smoothly and uniformly slide forwardly of the storage container housing when finger tabs 40 are gripped by the user.

Figure 2:
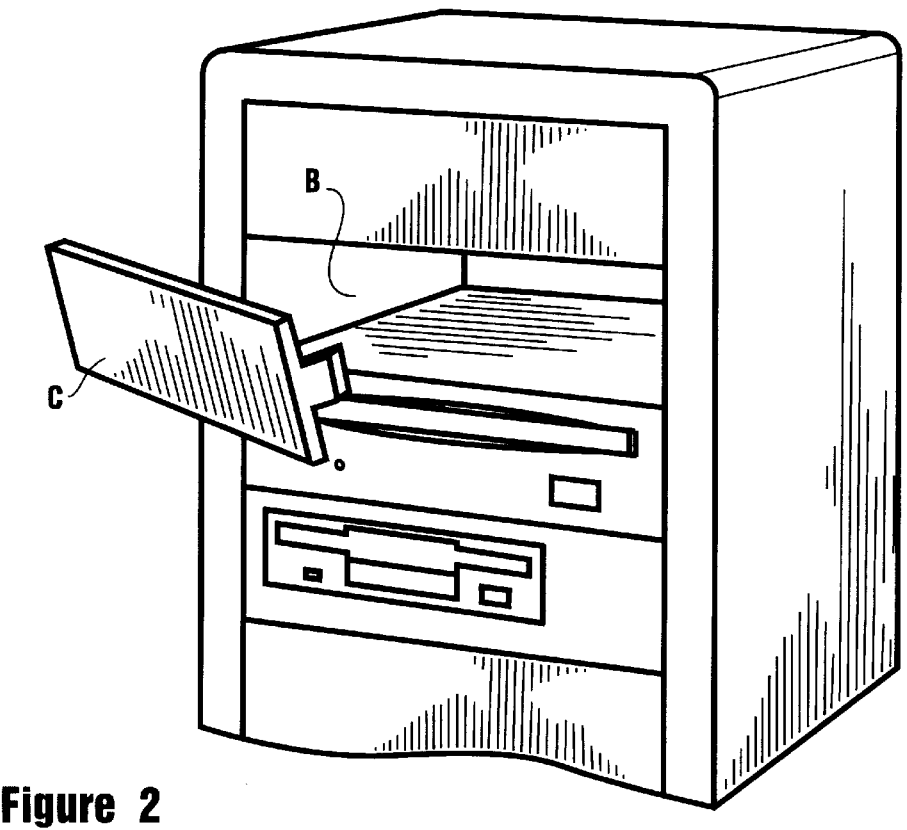
FIG. 2 is a generally perspective view of a conventional personal computer illustrating the removal of the cover which functions to close the front opening of an internal compartment or bay adapted to receive a conventional disk drive.
Figure 3:
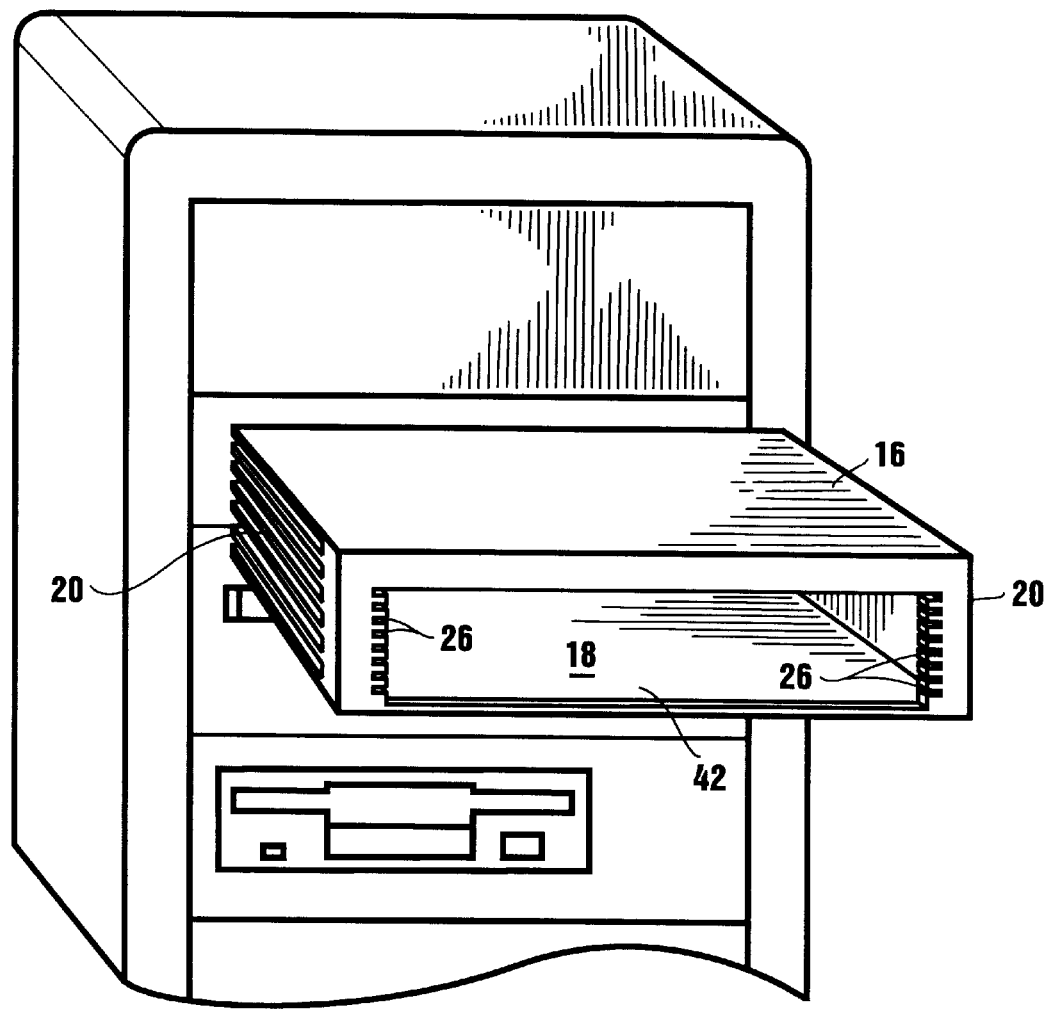
FIG. 3 is a generally perspective view similar to FIG. 2 illustrating the manner in which the housing of the container of the invention is insertable into the open bay of the personal computer.

Turning particularly to FIGS. 2 and 3, it is to be understood that the width of the storage container of the present invention is approximately 5¼" so as to snugly slide into the forward open bay "B" of the housing of the personal computer (FIG. 2). As shown in FIG. 2, bay "B" is normally closed by a removable cover "C". Whenever "C" is removed the interior of the empty bay is exposed to view. Therefore, with the cover "C" removed, the storage container of the present invention can be easily slipped into the forward open bay in the manner shown in FIG. 3 so that the storage container can be substantially encapsulated within the bay or disk drive chamber of the personal computer.

Before inserting the storage container into the forward open computer bay "B", the rear panel 46 of the container is removed in the manner shown in FIG. 5. This done, the plurality of compact disk storage trays 24 can be inserted into the storage container from the rear in the manner shown in FIG. 4. This is done by inserting the reduced thickness edges of the trays into selected groves 26 and then urging the storage disks forwardly of the container housing. When the compact disk storage trays are fully inserted into the housing the finger engaging tabs 40 will extend forwardly of the housing in the manner shown in FIG. 1. Similarly, the rear tabs 36 thereof will extend rearwardly of the housing will extend through the slots or vertically spaced apart openings 47 provided in rear panel 46 as the panel is once again connected to the housing. (FIG. 5)

Figure 5A:
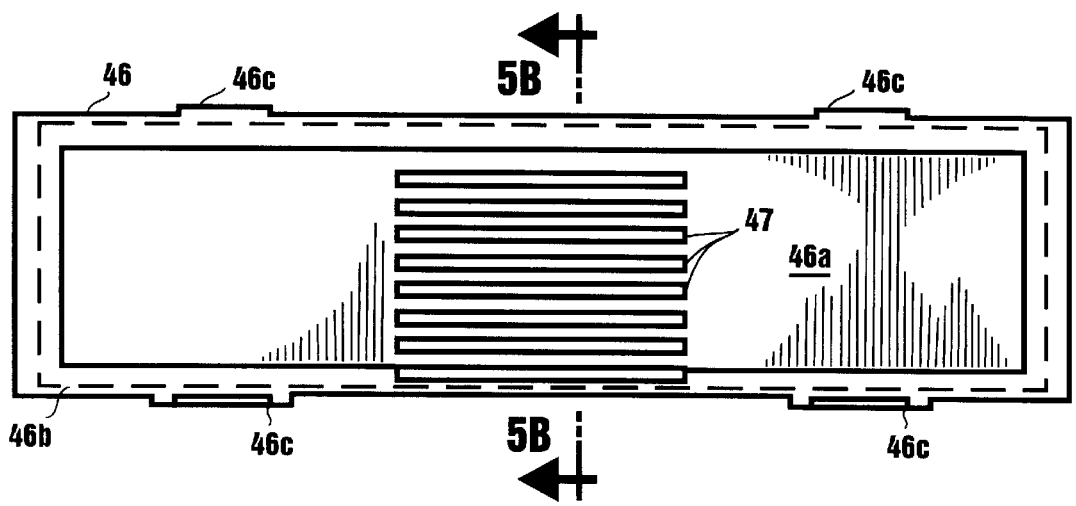
FIG. 5A is a enlarged rear view of the rear closure panel.
Figure 5B:
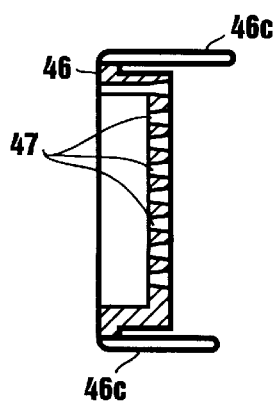
FIG. 5B is a cross-sectional view taken along lines 5B—5B of FIG. 5A.

As best seen in FIGS. 5, 5A and 5B, container engagement tabs 46C are provided on the top and bottom edges of panel 46. These tabs frictionally engage the container housing in a manner to prevent accidental separation of the back panel from the housing. When tabs 36 are in position within slots 47, protuberances 36a and 36b frictionally engage the walls of the slots in a manner to prevent accidental forward movement of trays 24 due to movement or vibration of the housing.

Figure 6:
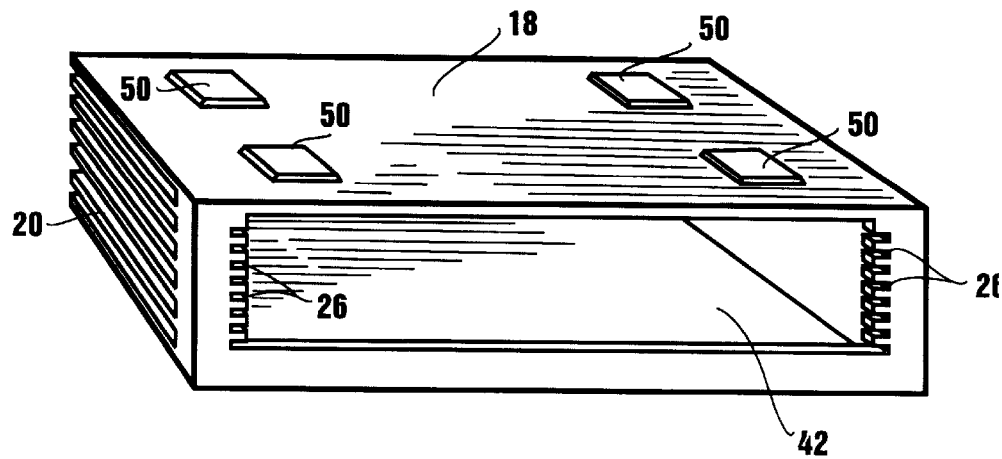
FIG. 6 is a generally perspective bottom view of an alternate form of the hollow housing of the storage container of the present invention.

Referring next to FIG. 6, an alternate form of the apparatus of the storage container of the present invention is there illustrated. In this form of the invention, the storage container is substantially identical to that previously described herein and like numerals are used to identify like components. The major difference between the storage container housing shown in FIG. 6 and that shown in FIG. 4, resides in the fact that the storage container shown in FIG. 6 is adapted to be in placed on a desk top or other smooth surface rather than be inserted into an empty drive bay of a personal computer. Accordingly, in this form of the invention the bottom wall 18 of the unit is provided with four spaced apart, elastomeric feet 50 having lower surfaces adapted to engage the desk top or other planar surface and in so doing tend to hold the storage container in position on the surface.

Figure 7:
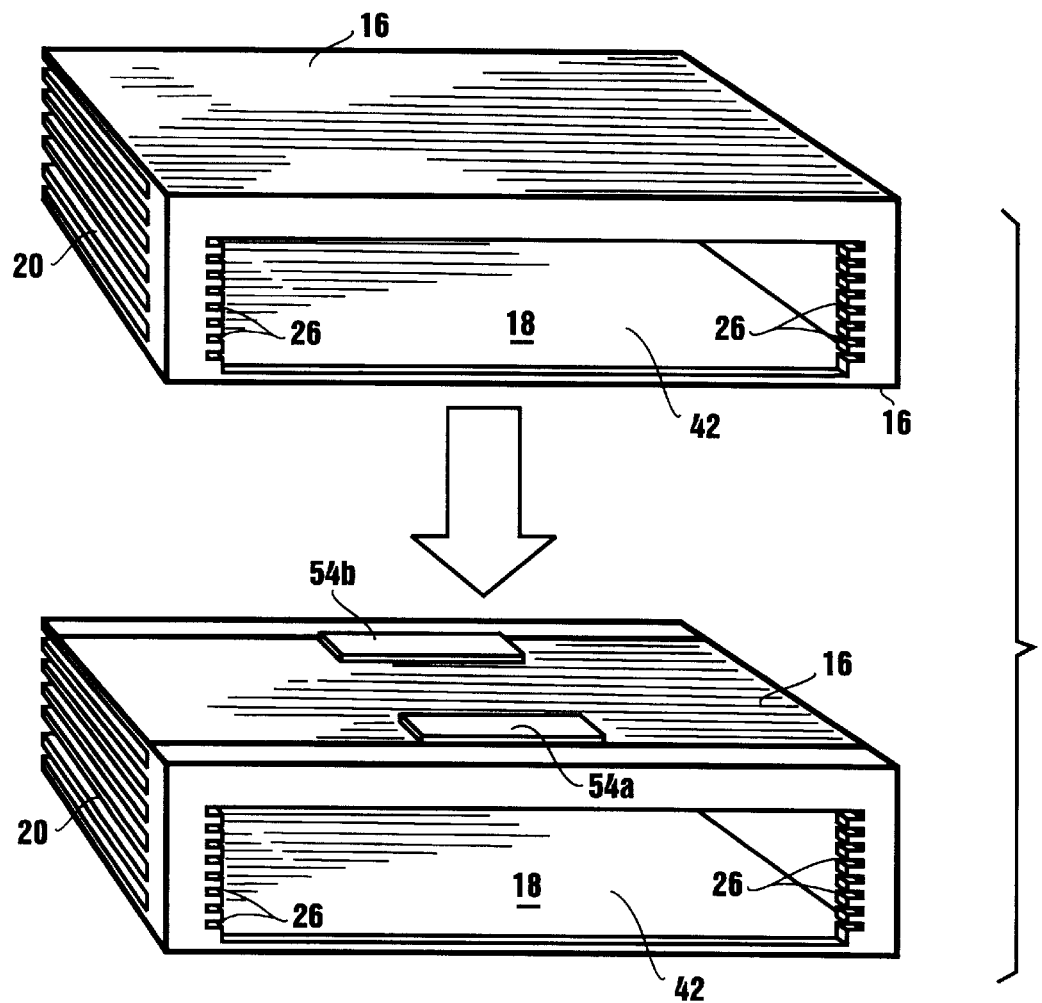
FIG. 7 is a generally perspective illustrative view of still another alternate form of the invention showing the manner in which one form of the housing of the invention is stacked upon a second hollow housing of an alternate construction.

Turning to FIG. 7, still another form of the invention is there shown. In this latest form of the invention the container housing of the storage container is once again of substantially identical construction to that shown in FIGS. 1 through 5 and like numerals are once again used to identify like components. In this latest form of the invention, however, the upper surface 16 of the storage container is provided with front and rear mounting strips 54a and 54b respectively. These mounting strips, which preferably have an adhesive coated upper surface, are adapted to engage the bottom wall 16 of a superiorly mounted storage container housing so as to hold the superior housing securely in position on top of the inferior housing of the storage unit. It is apparent that by using mounting strips 54a and 54b and in placing these mounting strips on the bottom wall of a superiorly mounted storage container, several storage containers can be securely stacked one on top of another to form a stacked array which is capable of conveniently storing a large number of compact disks.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made with out departing from the scope and spirit of the invention, as set forth in the following claims.

I claim:

1. A storage container for storing compact disks which is receivable within an internal compartment formed in the case of a personal computer that is normally used to house a disk drive, said storage container comprising:

(a) interconnected top, bottom, rear and opposing side walls defining a front open interior space, each said side wall having a plurality of spaced apart grooves formed therein and said rear wall having a plurality of spaced apart slots formed therein;

(b) a plurality of compact disk supporting trays, each having opposing edge portions slidably receivable within said grooves formed in said opposing side walls, each said opposing edge portions of each said support tray including stop means for preventing withdrawal of said tray from said storage container each said supporting tray comprising:

(i) a generally rectangular shaped body having a front edge, a rear edge, and a central portion said central portion having a generally circular shaped depression formed therein for closely receiving a compact disk;

(ii) a plurality of spaced apart tabs extending from said rear edge, said tabs being receivable within said slots formed in said rear wall; and (iii) a finger engaging tab extending from said front edge of said body.

2. A container as defined in claim 1 in which said front edge of said body portion of each of said trays includes a generally semi-circular finger receiving opening.

3. A storage container for storing compact disks which is receivable within an internal compartment formed in the case of a personal computer that is normally used to house a disk drive, said storage container comprising:

(a) interconnected top, bottom, rear and opposing side walls defining a front open interior space, each said side wall having a plurality of spaced apart grooves formed therein and said rear wall having a plurality of spaced apart slots formed therein;

(b) a plurality of compact disk supporting trays, each having opposing edge portions slidably receivable within said grooves formed in said opposing side walls, each said supporting tray comprising:

(i) a generally rectangular shaped body having a front edge, a rear edge, and a central portion, said central portion having a generally circular shaped depression formed therein for closely receiving a compact disk;

(ii) a plurality of spaced apart tabs extending from said rear edge, said tabs being receivable within said slots formed in said rear wall; and (iii) a finger engaging tab extending from said front edge of said body.

4. A container as defined in claim 3 in which each of said opposing edge portions of each said supporting tray includes stop means for preventing withdrawal of said tray from said front open interior space of said container.

5. A container as defined in claim 3 in which said front edge of said body portion of each of said trays includes a generally semi-circular finger receiving opening.

6. A container as defined in claim 3 in which said central portion of said body of each of said supporting trays includes a generally circular shaped central aperture.

7. A container as defined in claim 3 in which each of said tabs extending from said rear edge of central said trays includes a locking protuberance.

* * * * *